United States Patent [19]

Inoue et al.

[11] Patent Number: 5,208,645

[45] Date of Patent: May 4, 1993

[54] METHOD AND APPARATUS FOR OPTICALLY MEASURING THE THICKNESS OF A COATING

[75] Inventors: Akira Inoue; Yoichi Ishiguro; Haruhiko Aikawa, all of Kanagawa, Japan

[73] Assignee: Sumitomo Electric Industries, Ltd., Osaka, Japan

[21] Appl. No.: 641,784

[22] Filed: Jan. 16, 1991

[30] Foreign Application Priority Data

Feb. 23, 1990 [JP] Japan ............................ 2-40962
Jul. 19, 1990 [JP] Japan ........................... 2-189529

[51] Int. Cl.$^5$ .................... G01B 11/06; C03B 37/023; C03B 37/07
[52] U.S. Cl. .................................. 356/73.1; 65/3.11; 65/3.12; 356/382
[58] Field of Search ................ 356/73.1, 382; 65/3.11, 65/3.12

[56] References Cited

U.S. PATENT DOCUMENTS 3,017,512  1/1962  Wolbert .......................... 356/382 X
4,952,226  8/1990  Frazee, Jr. et al. ........... 356/73.1 X
4,957,526  9/1990  Frazee, Jr. et al. ................. 35/3.12

FOREIGN PATENT DOCUMENTS 0256539  2/1988  European Pat. Off. .
0294889  12/1988  European Pat. Off. .
0348607  1/1990  European Pat. Off. .

Primary Examiner—Vincent P. McGraw
Attorney, Agent, or Firm—Cushman, Darby & Cushman

[57] ABSTRACT

A method and an apparatus for measuring the thickness of a coating provided around a cylindrical object such as an optical fiber optically. The cylindrical object is irradiated by a measuring light and the light derived from the object is received by a photo-detector so that the intensity of the derived light is measured to thereby detect the thickness of the coating.

18 Claims, 13 Drawing Sheets

Peak − Dark = 214

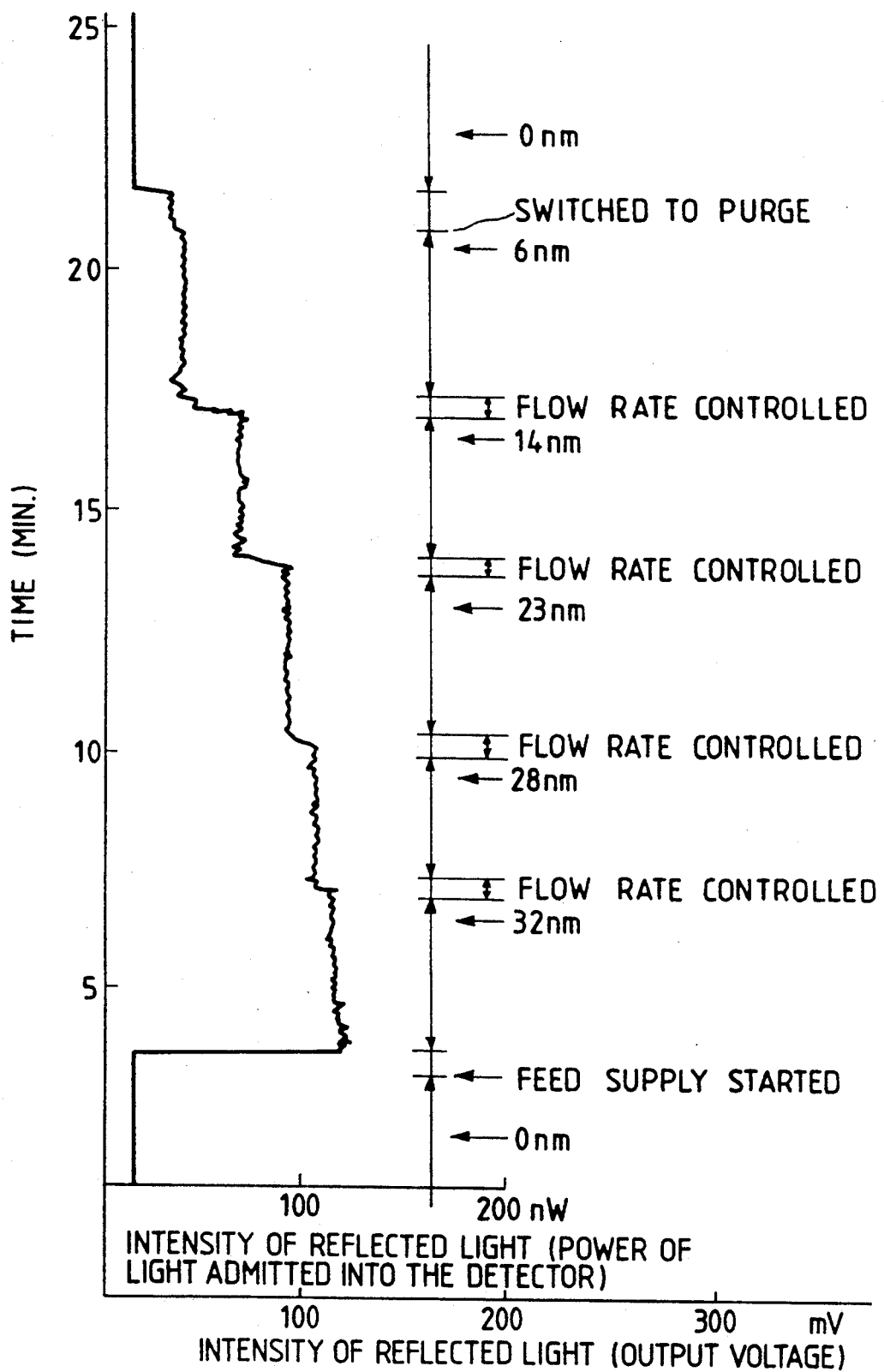

METHOD AND APPARATUS FOR OPTICALLY MEASURING THE THICKNESS OF A COATING

BACKGROUND OF THE INVENTION

The present invention relates to a method and an apparatus for measuring the thickness of a coating provided around a cylindrical object such as an optical fiber optically.

Quartz based fiber optics have a tendency to break if they are left to stand under tensile stress for a prolonged time. This phenomenon is commonly referred to as "fatigue". One of the methods for dealing with the fatigue problem is to prevent the growth of surface flaws by insuring that the surface energy of a quartz glass fiber is always held at high level. A specific way to perform this method is shown in FIG. 1. In FIG. 1, an optical fiber 30 including a doped silica core 31 and a silica cladding 32 is coated with a less water-permeable pyrolytic carbon film 33 (which is hereinafter referred to as "a carbon coating") by a CVD technique so that water will not be adsorbed on the surface of the fiber. Films such as this carbon coating that are closely adherent to a substrate (in this case, optical fiber 30) and which are less permeable to gases are commonly referred to as "hermetic coatings".

The optical fiber having the carbon coating film 33 benefits from the preferred property of low water permeation and this property is known to vary greatly with the thickness of the carbon coating. If the thickness of the coating is increased in order to reduce the permeation of $H_2$ and water as much as possible, an increasing amount of by-products will be deposited on the inside surface of the reaction tube during fiber production and the resulting contact of the deposit with the bare fiber causes its initial strength to decrease, thereby making it impossible to continue the fiber production for a long time.

Hence, the thickness of carbon film that is sufficient to prevent water permeation and which will not cause any adverse effects of by-products should be held within certain limits and it is necessary to control the film thickness during fiber production. To this end, the first thing to do is to measure the correct thickness of the carbon film.

Measuring film thicknesses in the range of ca. 200–1,000 Å which are generally considered to be preferable for practical carbon coatings requires complex analytical techniques such as FE-SEM (Field Emission-Secondary Electron Microscope) and AES (Auger electron spectroscopy) in which an object to be measured is irradiated by an electron beam and an energy of Auger electrons generated from the surface of the object is measured to detect the composition of the object and, hence, the development of a means that allows the film thickness of carbon coatings to be easily checked during fiber production has been desired.

Using the correlation between the thickness of a film and its electric resistance, the present inventors proposed that the thickness of carbon coatings not thicker than 0.1 μm be determined nondestructively by measuring their electric resistance.

A circuit for implementing this method is shown in FIG. 2(a), in which the electric resistance of an optical fiber 41 having a pyrolytic carbon coating is measured with guides 42 and 43 made of a metal such as phosphor bronze being used as electric contacts. Shown by 44 is not an electric contact but a mere guide. Another circuit is shown in FIG. 2(b), in which the measurement of electric resistance is conducted with melts of a metal such as mercury 45 in dies 46 and 47 through which pass the optical fiber 41 being used as electric contacts.

In the methods described above, the optical fiber 41 to be measured has to be placed in contact with guides 42 and 43 or molten metal 45 and there is high likelihood that the mechanical strength of the fiber will deteriorate as a result of this fiber contact with other objects. Thus, it has been desired to develop a nondestructive and non-contact method for measuring the thickness of coating films.

SUMMARY OF THE INVENTION

An object, therefore, of the present invention is to provide a method and an apparatus with which the thickness of a coating film on a specimen to be measured such as an optical fiber can be measured in a non-contact manner by employing an optical means so as to prevent deterioration of the specimen to be measured.

The above and other objects of the present invention are attained by a method of measuring the thickness of a film which comprises the steps of setting a specimen to be measured which is a cylindrical member that is generally transparent at an analyzing wavelength and that has a coating which is translucent at said wavelength, illuminating the specimen with parallel rays of light in a direction that is perpendicular to the length of the specimen, receiving the refracted rays from the specimen by means of an image detecting device, and measuring the thickness of the coating on the specimen on the basis of the peak levels of the intensity of light condensed by the lens effect of the specimen.

The refracted light from the specimen is condensed by its lens effect and admitted into the image detecting device as an intensity distribution having two peak levels. Those peak levels are correlated to the thickness of coating on the specimen since the quartz glass fiber at the analyzing wavelength is not lossy over an optical path length that corresponds to the dimension of the fiber. Therefore, the thickness of the coating can be determined at the peak levels on the basis of a calibration curve that correlates those peak levels to the film thickness preliminarily determined by another method such as the measurement of electric resistance. In this way, the thickness of the coating of interest can be measured by an optical non-contact method.

The above objects of the invention are also attained by the provision of a method of measuring the thickness of a thin film of coating having a metallic gloss that surrounds an optical fiber, which method comprises applying rays of light onto the surface of said thin film coated optical fiber and measuring the intensity of light reflected from said thin film of coating.

The above objects of the present invention are further attained by an apparatus for measuring the thickness of a coating film that has a source of parallel rays of light, a first focusing lens, a shield member, a second focusing lens and a photo-detector arranged in the order written on a single axis, said parallel rays of light having neither 0% nor 100% transmittance through a coated cylindrical specimen to be measured, the distance between said source of parallel rays of light and the first focusing lens being longer than the focal length of said first focusing lens, the distance between said first focusing lens and the shield member being equal to the focal distance of said first focusing lens, the distance between said second focusing lens and said photo-detector being equal to the focal length of said second focusing lens, said shield member having a sufficient size to shield a spot of parallel rays condensed by said first focusing lens, the cylindrical specimen being positioned at the focal point of said first focusing lens on the side closer to said source of parallel rays of light in a direction perpendicular thereto, and the thickness of the coating film around said cylindrical specimen being determined on the basis of the quantity of light received by said photo-detector.

The distance between the first focusing lens and the shield member need not be exactly equal to the focal length of the first focusing lens and they may be equal to each other within the limits of errors that are permissible for practical purposes. This is also true with the distance between the second focusing lens and the photo-detector and it may be equal to the focal length of the second focusing lens within the limits of errors that are permissible for practical purposes. Further, the position of the cylindrical specimen may correspond to the focal point of the first focusing lens within the limits of errors that are permissible for practical purposes.

Part of the parallel rays emitted from the light source is admitted into the specimen and emerges therefrom after refraction but the other part will not be admitted into the specimen. The parallel rays of light that are not admitted into the specimen are condensed by the first focusing lens and adsorbed by the shield member so that they will not be admitted into the second focusing lens or the photo-detector.

The rays of light that emerge from the specimen after refraction are condensed by passage through the first and second focusing lenses and are admitted into the photo-detector as a light intensity signal. This light intensity signal is correlated to the thickness of coating on the specimen since the quartz glass fiber at the analyzing wavelength (i.e., the wavelength used to detect the thickness of coating) is not lossy over an optical path length that corresponds to the dimension of the fiber. Therefore, the thickness of the coating can be determined from the light intensity signal on the basis of a calibration curve that correlates the light intensity signal received by the photo-detector to the film thickness preliminarily determined by another method such as the measurement of electric resistance. In this way, the thickness of the coating of interest can be measured by an optical non-contact method.

Even if the specimen is other than quartz glass fibers and hence is lossy, the thickness of coating can be determined from the light intensity signal on the basis of a calibration curve constructed to allow for losses.

BRIEF DESCRIPTION OF THE DRAWINGS

In the accompanying drawings:

FIG. 4(d) is a timing chart showing the results of in-line measurement of the intensity of reflected light in the example of the present invention in which carbon coatings of various thicknesses (as estimated from the values of their electric resistance) were formed by changing the condition of feed gas;

DESCRIPTION OF THE PREFERRED EMBODIMENTS

Figure 1:
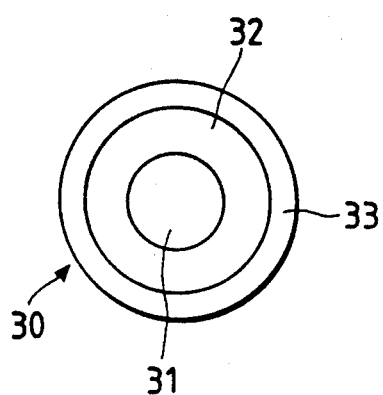
FIG. 1 is a cross section of a carbon-coated quartz glass fiber.
Figure 2A:
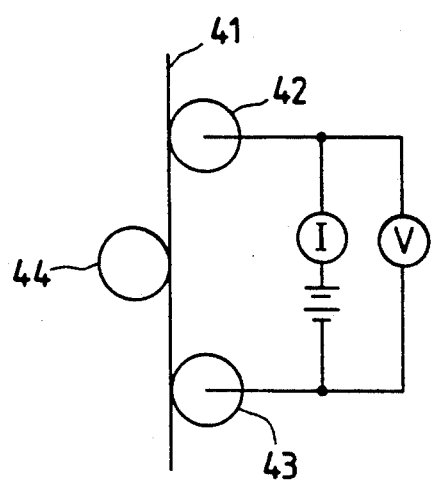
FIGS. 2(a) and 2(b) illustrate two prior art techniques for measuring the thickness of a coating film.
Figure 2B:
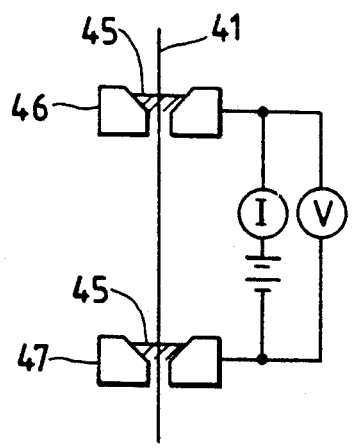
Figure 3A:
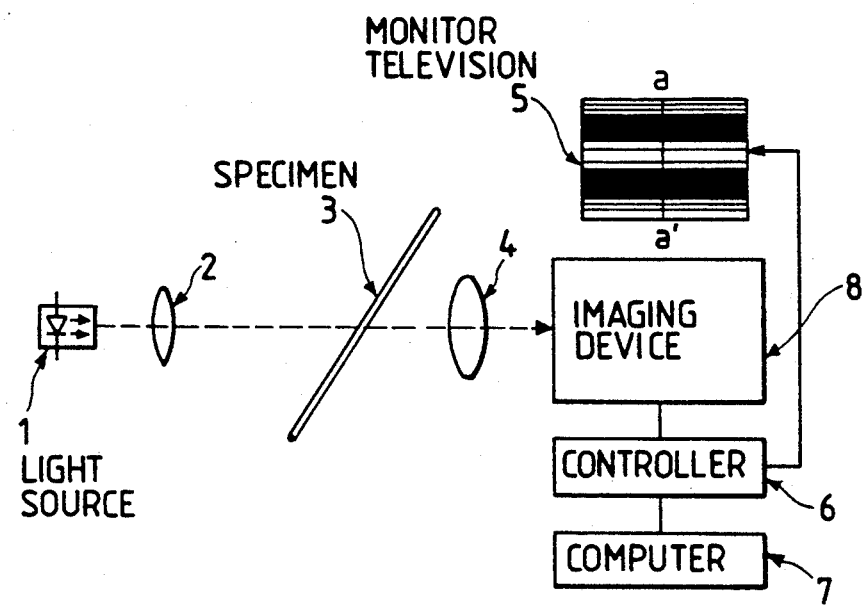
FIG. 3(a) is a schematic view showing the construction of an apparatus for implementing the present invention in one embodiment.

An apparatus for implementing the method of the present invention is first described with reference to FIG. 3(a), in which reference numeral 1 designates a light source such as a LED that emits a light which is collimated with a collimator lens 2. Shown by 3 is a specimen, or a quartz glass fiber having a carbon coating. The collimated light from the lens 2 produces an intensity distribution due to the refracted light from the surface of the glass fiber 3. The refracted light from the glass fiber 3 is passed through an imaging lens 4 to be admitted into an imaging device 8. Shown by 5 is a monitor television for observing the intensity distribution of light detected by the imaging device 8, and 7 is a computer that analyzes the intensity distribution of the refracted light that is supplied from the imaging device 8 via a controller 6.

Figure 3B:
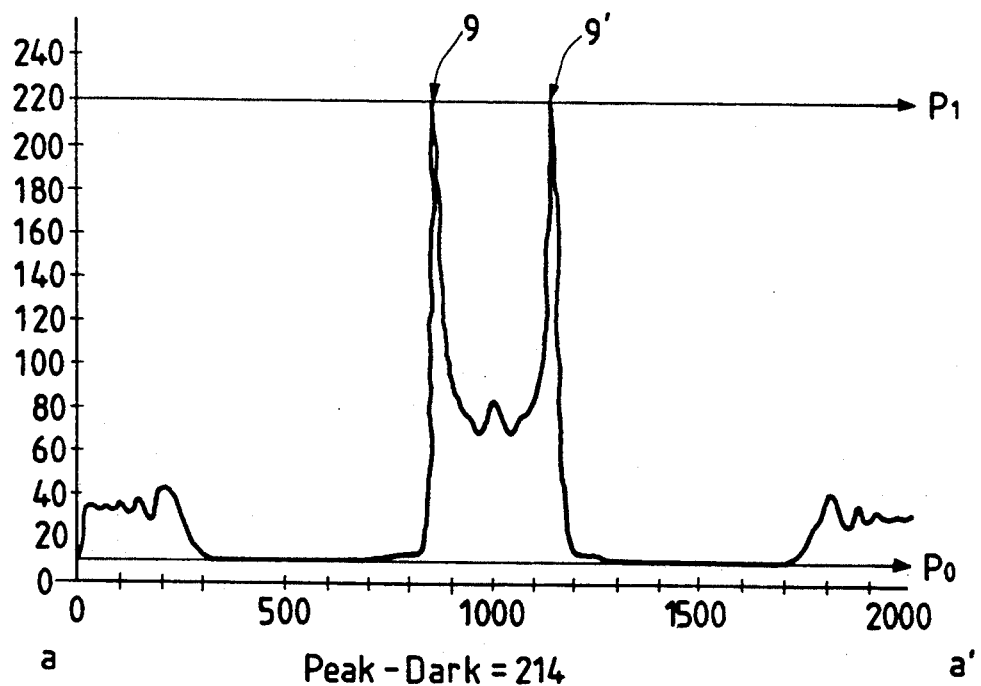
FIG. 3(b) is a scan of an observed intensity distribution of refracted light.

FIG. 3(b) shows a scan of the intensity distribution of the refracted light from the glass fiber 3 as measured for points (a)-(a') on the screen of monitor television 5. In FIG. 3(b), peaks 9 and 9' are those of the light condensed by refraction on the surface of the optical fiber and they correspond to the ray of light that have passed through the carbon coating and the quartz glass fiber per se. An investigation with a spectroscope showed that the light transmittance of carbon was approximately 50% for a thickness of 350 Å in the visible to near infrared region. The quartz glass fiber per se is substantially non-lossy over an optical path length that corresponds to the dimension of the fiber (typically 125 μm). It was therefore presumed that peak levels 9 and 9' would reasonably correlate to the thickness of carbon coating. On the basis of this presumption, the thickness of the carbon coating of interest can be determined from a calibration curve that correlates the thickness of carbon coating as measured by another method such as the measurement of electric resistance to the peak levels 9 and 9' as obtained by the optical method of the embodiment described above.

Figure 3C:
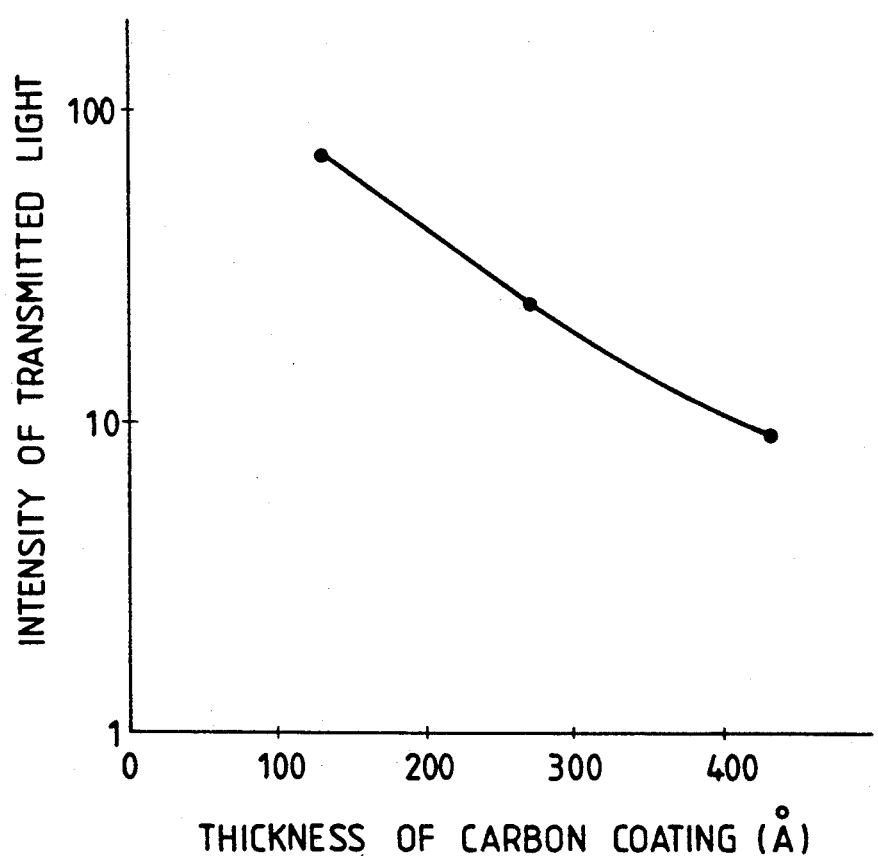
FIG. 3(c) is a characteristic graph showing the relationship between the intensity distribution of transmitted light and the thickness of carbon coating.

As a specific example of the method of the present invention, an experimental system was constructed using said method in order to detect peak levels 9 and 9' on carbon coated fibers (o.d. 125 $\mu$m) having coating thicknesses of 130 Å, 270 Å and 430 Å as measured by the electric resistance method. The light source 1 in the system was a LED emitting at a wavelength of 0.73 $\mu$m; the imaging lens 4 was an objective lens having a magnifying power of X150; and the imaging device 8 was a scanning camera using a one-dimensional line sensor consisting of 2,048 pixels. For achieving consistent results of measurement, an automatic position adjustment was effected to maintain the distance between the imaging lens 4 and the carbon coated fibers under test at a constant level. FIG. 3(c) shows a plot of the relationship between the thickness of carbon coating and the quantity of light transmission. Using this calibration curve, it was possible to estimate the thickness of various carbon coatings on the basis of the intensity of transmitted light from the lateral side of the glass fiber 3.

As described on the foregoing pages, the method of the present invention comprises applying parallel rays of light onto an object to be measured, obtaining an intensity distribution of the refracted light and determining the peak levels in that distribution, and this permits the thickness of the coating on the object to be determined in a non-contact manner.

Further, on-line measurements of the thickness of coating can be performed as the object to be measured is produced. The results of a specific measurement are immediately fed back to the coating device and by continuing the production with a relevant parameter such as the feed of coating materials being properly adjusted, a coating having the appropriate thickness can be obtained.

The second embodiment of the present invention will be described with reference to FIGS. 4(a) to 4(d), in which the measurement is carried out by using a light reflected from an object having a thin film coating to be measured.

Figure 4A:
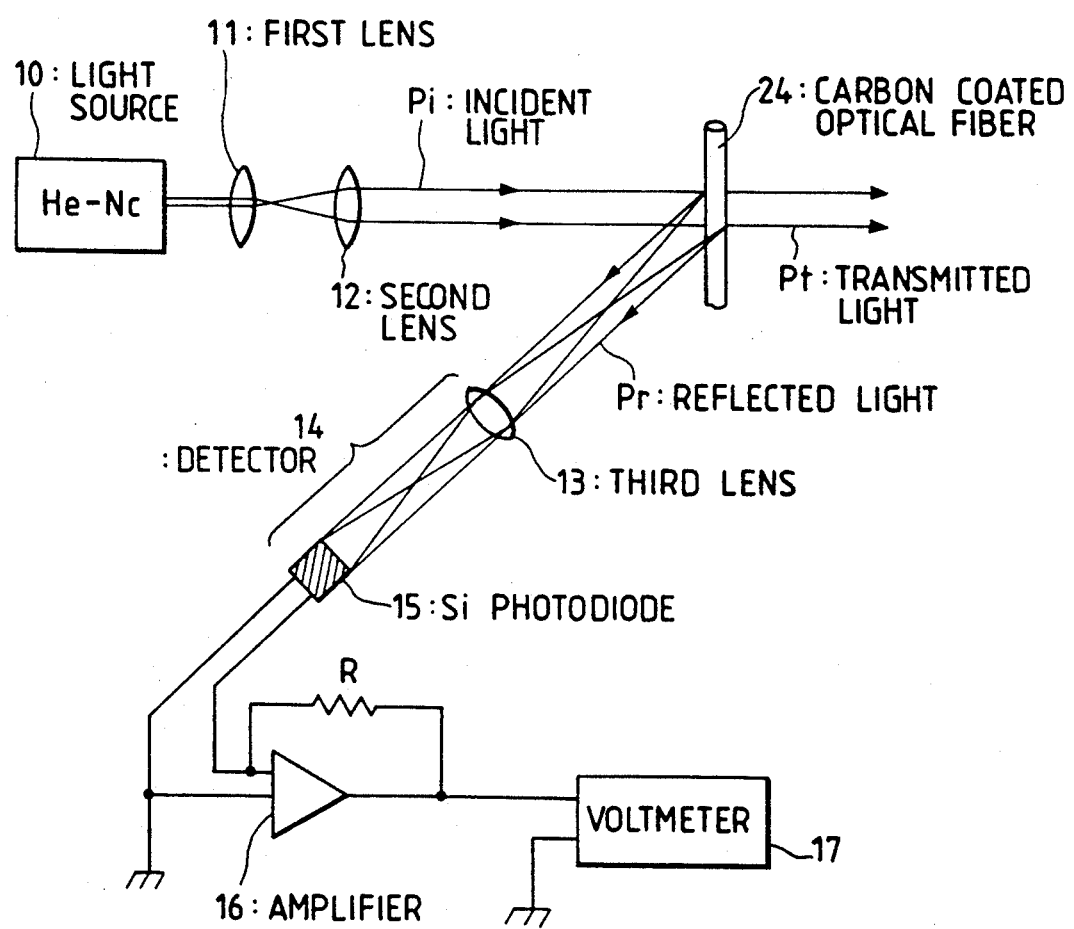
FIG. 4(a) is a schematic diagram showing another embodiment of the the present invention.

FIG. 4(a) is a showing schematically diagram a system of measurement 18 incorporating the concept of the present invention. Referring to FIG. 4, the beam of light Pi emitted from a light source 10 such as a He-Ne laser is expanded by the combination of a first lens 11 and a second lens 12 and is admitted into an optical fiber 24 comprising a glass fiber 20 coated with a pyrolytic carbon film 23. Reflected light Pr from the coated optical fiber 24 is focused on a detector 14 by means of a third lens 13 and its power (intensity) which may be detected with a Si photo-diode 15 is amplified by an amplifier 16 and measured as a variation in voltage by means of a voltmeter 17.

Figure 5:
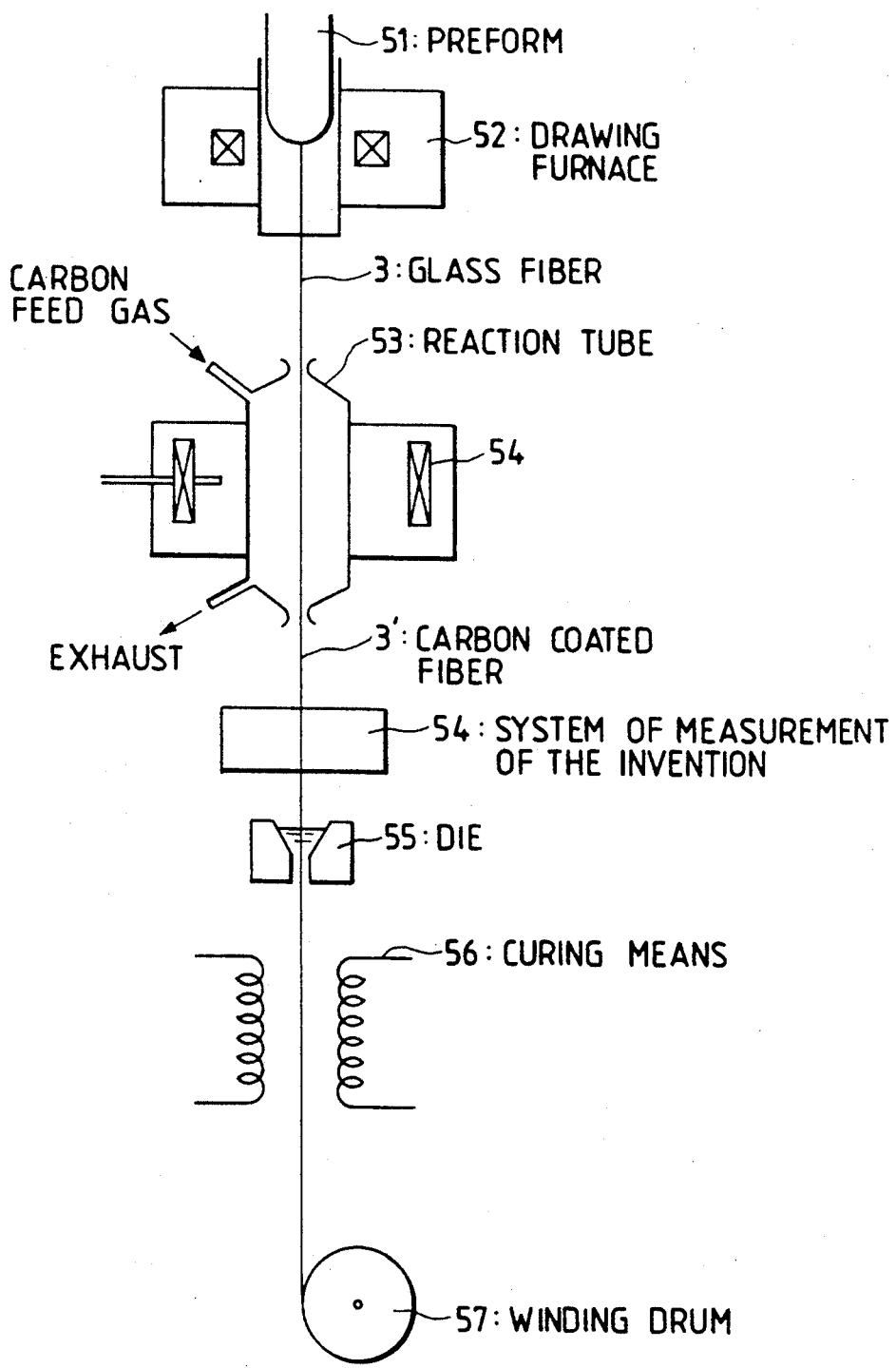
FIG. 5 is a schematic diagram showing an arrangement of an optical fiber manufacturing system according to the present invention.

The system of measurement 54 may be applied to the process of optical fiber production as shown in FIG. 5. A preform 51 is melted in a heating furnace 52 and drawn into a bare fiber 3. The fiber 3 is then guided into a pyrolytic coating reaction tube 53 where a carbon coating 23 is formed around the fiber 3. The carbon coated fiber 3, is further passed through a die 55 to have a resin coated on its periphery. As shown in FIG. 5, the system of measurement 54 according to the present invention is installed between the pyrolytic carbon coating reaction tube 53 and the die 55. In the state of the art, the fiber 3' moving from the reaction tube 53 to the die 55 inevitably undergoes vibrations with an amplitude of less than 1 mm. Therefore, in order to ensure that the variation in the intensity of reflected light can be neglected even if the fiber 3, vibrates with an amplitude of about 1 mm, the beam of light Pi emerging from the second lens 12 preferably has a diameter of 5-10 mm. Further, a proper optical system has to be selected in such a way that the image focused on the detector 14 will not go beyond its light-receiving surface even if the fiber vibrates by an amplitude of 1 mm. In FIG. 5, numeral 54 represents a heater, 56 is a resin curing means, and 57 is a winding drum. In order to insure that the intensity of scattered light will vary greatly in response to a change in the thickness of carbon coating, the angle the optical axis connecting the light source 10 and the carbon coated fiber 24 forms with the optical axis connecting the fiber and the detector 14 is preferably acute in the range of from 10 to less than 90 degrees.

In the course of their studies to accomplish the present invention, the present inventors conducted the following experiment.

Figure 4B:
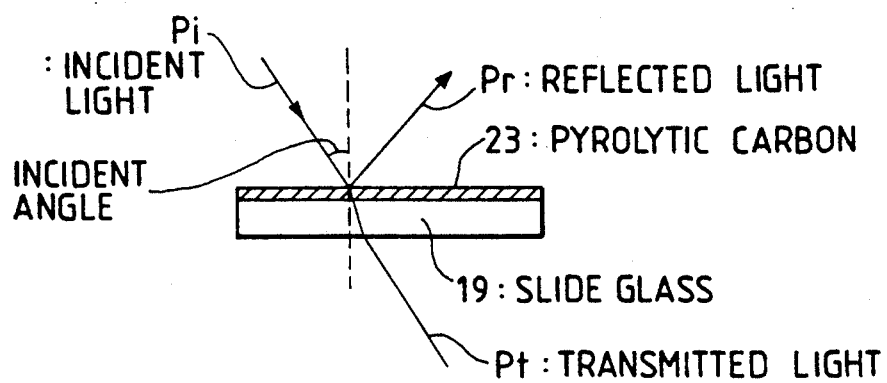
FIG. 4(b) is a schematic diagram illustrating the experiment conducted in the course of accomplishment of the present invention.

(1) A pyrolytic carbon film 23 was deposited in a thickness of 200 Å, 400 Å or 600 Å on a slide glass 19 as shown in FIG. 4(b), thereby preparing three samples for the experiment.

(2) Using these three samples and a control which was a slide glass having no pyrolytic carbon coating, light having an intensity of Pi was applied at an incident angle of 30 degrees as shown in FIG. 4(b), and the intensities of transmitted light Pt and reflected light Pr were measured to determine the transmittance (Pt/Pi) and reflectance (Pr/Pi). The results were as shown in the following table.

TABLE

| FILM THICKNESS | Pt/Pi | Pr/Pi |
|---|---|---|
| 0 Å | 0.9 | 0.1 |
| 200 Å | 0.7 | 0.2 |
| 400 Å | 0.5 | 0.3 |
| 600 Å | 0.35 | 0.35 |

The tables shows that the thickness of carbon coating is correlated to the intensity of reflected light. The results of the experiment therefore clearly show that not only transmittance but also reflectance can be used as a means of measuring the thickness of carbon coating.

Measurements of transmitted light are difficult to achieve on fine-diameter samples such as optical fibers since some part of the incident light does not pass through the fiber but just passes by it to be directly admitted into the detector. This difficulty is absent from the measurement of reflected light as in the present invention and the thickness of carbon coating can be measured in an easy and correct manner.

Stated more specifically, a calibration curve that correlates the intensity of reflected light from a thin film and its thickness is preliminarily constructed and the thickness of a thin film of interest can be determined on the basis of this standard curve.

The method of the present invention is not only applicable to the measurement of the thickness of a carbon coating on optical fibers; it can also be used effectively to measure the thickness of all other hermetic coatings having a metallic gloss formed around optical fibers, such as Al, In, Au, Ti, Ag and Sn coatings.

Theoretically, the range of film thicknesses that can be measured by the method of the present invention is determined from the "depth of penetration of an electromagnetic film into a film" which in turn is dependent on the "dielectric constant of the film" and the "wavelength of the electromagnetic wave from a light source". If the thickness of the film is smaller than the depth of penetration, the intensity of reflected light from the film will vary with the film thickness. According to the experiments conducted by the present inventors, film thicknesses up to about one third of the operating wavelength of a light source could be measured and this was substantially independent of the constituent material of the film whether it was made of C, Al, In, Au, Ti, Ag, Sn or some other metal. For instance, measurements of up to 200 nm could be achieved on all kinds of films using a He-Ne laser ($\lambda = 633$ nm) as a light source.

Other light sources that can be used in the method of the present invention include a He-Cd laser, an Ar laser, a red emitting LED, a halogen lamp, a tungsten, etc.

Figure 4C:
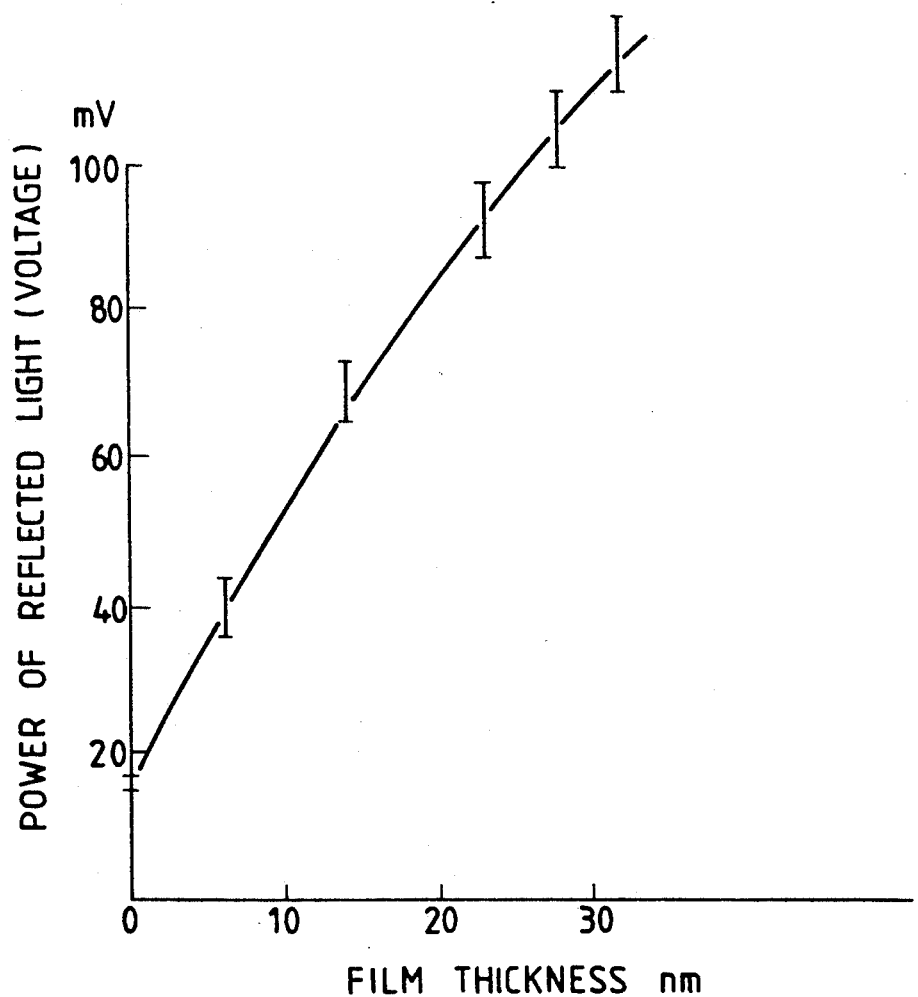
FIG. 4(c) is a graph showing the relationship between the thickness of carbon coatings formed in the example of the present invention and the intensity of reflected light.

Film thickness measurements were performed by the method of the present invention using a system of the configuration shown in FIG. 5. The thickness of carbon coating was adjusted by controlling the concentration of carbon material and estimated from the electric resistance of the coating film. The light source used in this example was a He-Ne laser operating at a wavelength of 0.633 $\mu$m (output power, 2 mW; Model GLG-5300 of Nippon Electric Company Limited). The incident light beam had a diameter of 10 mm, and the angle the optical axis connecting the light source and the optical fiber formed with the optical axis connecting the fiber and the detector (Si photo-diode available from Advantest Co., Ltd. under the trade name "TQ 8210 Power Meter") was 30 degrees. As shown in FIG. 4(d), the flow rate of carbon material for carbon coating was varied to produce film thicknesses of 32 nm, 28 nm, 23 nm, 14 nm, 6 nm and 0 nm. The resulting correlation between the power of light (nW) admitted into the detector and its output (mV) was as shown in FIG. 4(d). The thickness of carbon coating (nm) correlated to the power of reflected light (voltage in mV) was as shown in FIG. 4(c), from which one can see that the thickness of films can be measured from the intensity of reflected light and that the method of the present invention can also be used in a fiber drawing line where positional variations of up to about 1 mm are common.

The foregoing description is directed to the case of measuring the thickness of carbon coating but it should be noted that the method of the present invention was equally effective in measuring the thickness of other hermetic coatings having a metallic gloss that were formed on the surface of optical fibers.

Using an optical system, the method of the present invention enables the thickness of a coating film on optical fibers to be measured in a non-contact manner while eliminating the possibility of deterioration the strength of optical fibers during measurement.

Further, on-line measurements of the thickness of a coating film can be performed as an optical fiber is produced. The results of a specific measurement are immediately fed back to the coating device and by continuing the production with a relevant parameter such as the feed of coating materials being properly adjusted, an optical fiber having a coating of the appropriate thickness can be produced.

The method of the present invention is particularly effective when applied to the production of optical fibers having a carbon coating and other hermetic coatings with a metallic gloss.

Figure 6:
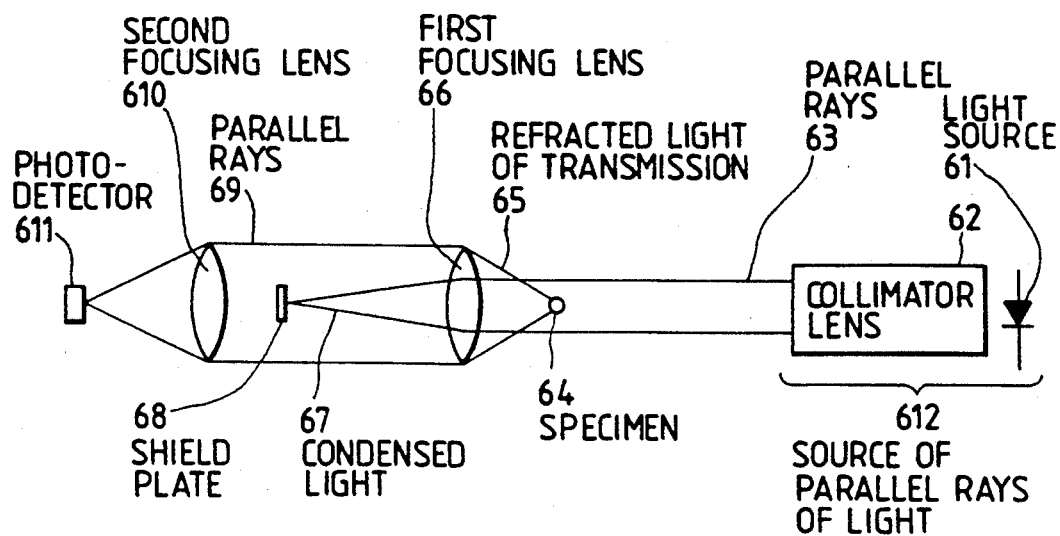
FIG. 6 is a schematic diagram showing the other embodiment of an apparatus according to an embodiment of the present invention.

The present invention is described below with reference to FIGS. 6 and 7. FIG. 6 shows the construction of an apparatus according to an embodiment of the present invention. Shown by 61 is a light source such as a LED, and 62 is a collimator lens. The combination of 61 and 62 makes light source 612 that emits parallel rays of light 63. Shown by 64 is a cylindrical member which in the case under consideration is a quartz glass fiber having a pyrolytic carbon coating (hereinafter referred to as "carbon coating") on its periphery. The source of parallel rays of light 612 is adapted to emit light that has neither 0% nor 100% transmittance with respect to the carbon-coated quartz glass fiber 64.

The light source 612, the carbon-coated quartz glass fiber 64 the axis of which is oriented in a direction perpendicular to the parallel rays of light 63, a first focusing lens 66, an appropriate shield plate 68, a second focusing lens 610 and a photo-detector 611 are arranged in the order written on a single optical axis. The first focusing lens 66 is positioned at a point that is away from the carbon-coated quartz glass fiber 64 by a distance equal to the focal length of said lens. The shield plate 68 is positioned at a point that is away from the first focusing lens 66 by a distance equal to the focal length of the same lens. Further, the photo-detector 611 is positioned at a point that is away from the second focusing lens 610 by a distance equal to the focal length of the lens.

Because of this arrangement, part of the parallel rays of light 63 is admitted into the carbon-coated quartz glass fiber 64 and emerges therefrom after refraction. The thus transmitted rays 65 are collimated by the first focusing lens 66 and the resulting parallel rays 69 are then admitted into the second focusing lens 610. The other part of the parallel rays of light 63 which does not pass through the carbon-coated quartz glass fiber 64 is directly admitted into the first focusing lens 66 and the resulting condensed light 67 is absorbed by the shield plate 68 positioned at the focal point of the first focusing lens 66. The second focusing lens 610 allows the parallel rays 69 from the first focusing lens 66 to be condensed at the photo-detector 611.

In the optical system described above, the shield plate 68 has the necessary and sufficient size to shield the condensed light 67 and this insures that almost all of the refracted light of transmission 65 from the carbon-coated quartz glass fiber 64 is effectively isolated from the other rays of light 63 before it is admitted into the photo-detector 611.

An investigation with a spectroscope showed that the light transmittance of carbon was approximately 50% for a thickness of 350 Å in the visible to near infrared region. The quartz glass fiber per se is substantially non-lossy over an optical path length that corresponds to the dimension (typically 125 $\mu$m as the outside diameter). Hence, the quantity of light reception by the photo-detector 611 is uniquely related to the thickness of carbon coating and the thickness of the carbon coating of interest can be determined on the basis of a calibration curve that correlates the thickness of coating as measured by another method such as the measurement of electric resistance to the quantity of light reception by the photodetector 611 in the apparatus of the embodiment under consideration.

As a specific example of the apparatus of the present invention, an experimental system was constructed using said apparatus in order to investigate the quantity of light reception by the photo-detector 611 on carbon-coated quartz glass fibers (o.d. 125 µm) having coating thicknesses of 160 Å, 270 Å, 340 Å, 430 Å, 620 Å and 720 Å as measured by the electric resistance method. The light source 61 in the system was a LED emitting at 0.73 µm; the first focusing lens 66 was a camera lens having an F number of 1.2 and a focal length of 50 mm; the second focusing lens 610 was a single lens having a diameter of 50 mm and a focal length of 100 mm; and the photo-detector 611 was a silicon photo-diode having a light-receiving area of 5.8 mm by square. In order to eliminate the adverse effects of stray light, an interference filter that was transmissive of light having a wavelength of 0.73 µm placed in front of the photo-detector 611. Further, the light source 61 was subjected to a.c. modulation and the photo-detector 611 was equipped with a bandpass filter to achieve narrow-band signal reception.

Figure 7:
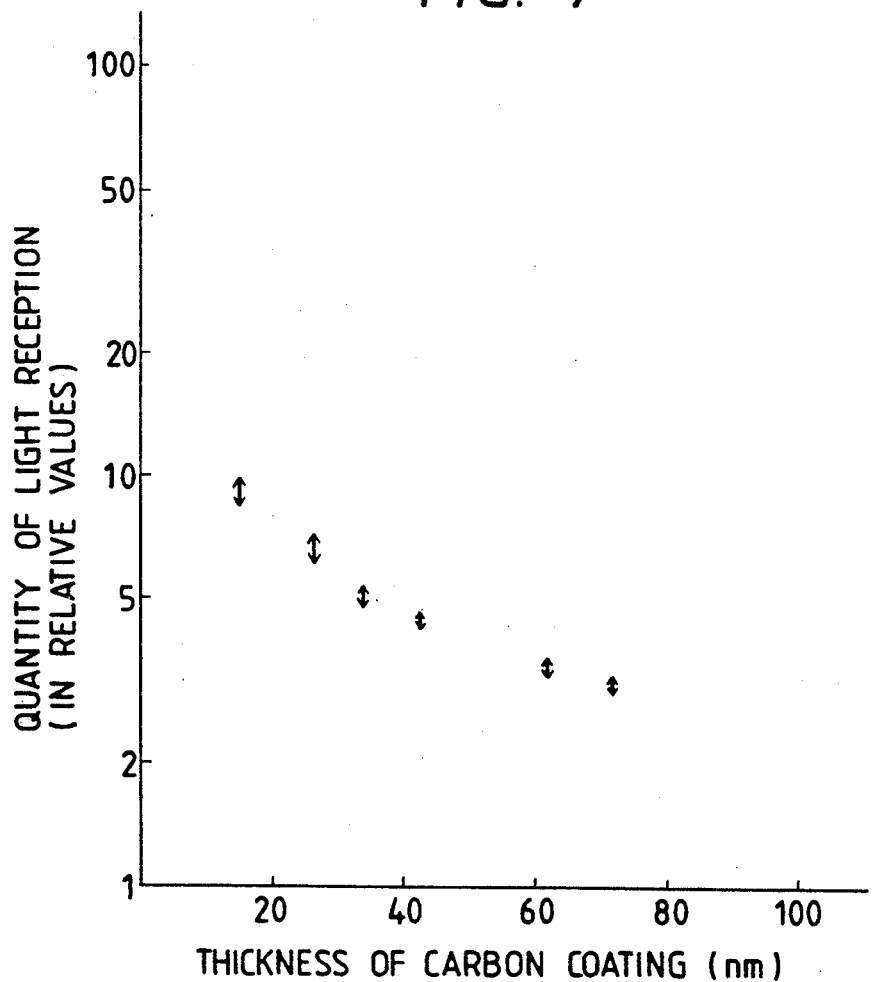
FIG. 7 is a characteristic graph showing the quantity of light reception by a photo-detector vs the thickness of carbon coating.

FIG. 7 shows the relationship between the thickness of carbon coating and the quantity of light reception by the photo-detector 611, as determined in the experiment described above. In FIG. 7, the length of each two-headed arrow represents the variation in the output of photo-detector 611 that occurred when the carbon-coated quartz glass fiber 64 was moved from the center of measurement in either the horizontal or vertical direction within the limits of ±0.5 mm.

Using the calibration curve constructed from the data shown in FIG. 7, one can determine the thickness of a specific carbon coating on the basis of the intensity of refracted light of transmission from the lateral side of the carbon-coated quartz glass fiber 64.

Further, as is also clear from FIG. 7, the quantity of light reception by the photo-detector 11 is virtually insensitive to small displacements of the carbon-coated quartz glass fiber 4 in both the horizontal and vertical directions. This stability in output characteristics is due to the fact that the first focusing lens 66 which is usually adequately larger than the diameter of the carbon-coated quartz glass fiber 64 ensures that small displacements of the carbon-coated quartz glass fiber 64 will cause only negligible changes in the status of parallel rays of light 69.

Figure 11:
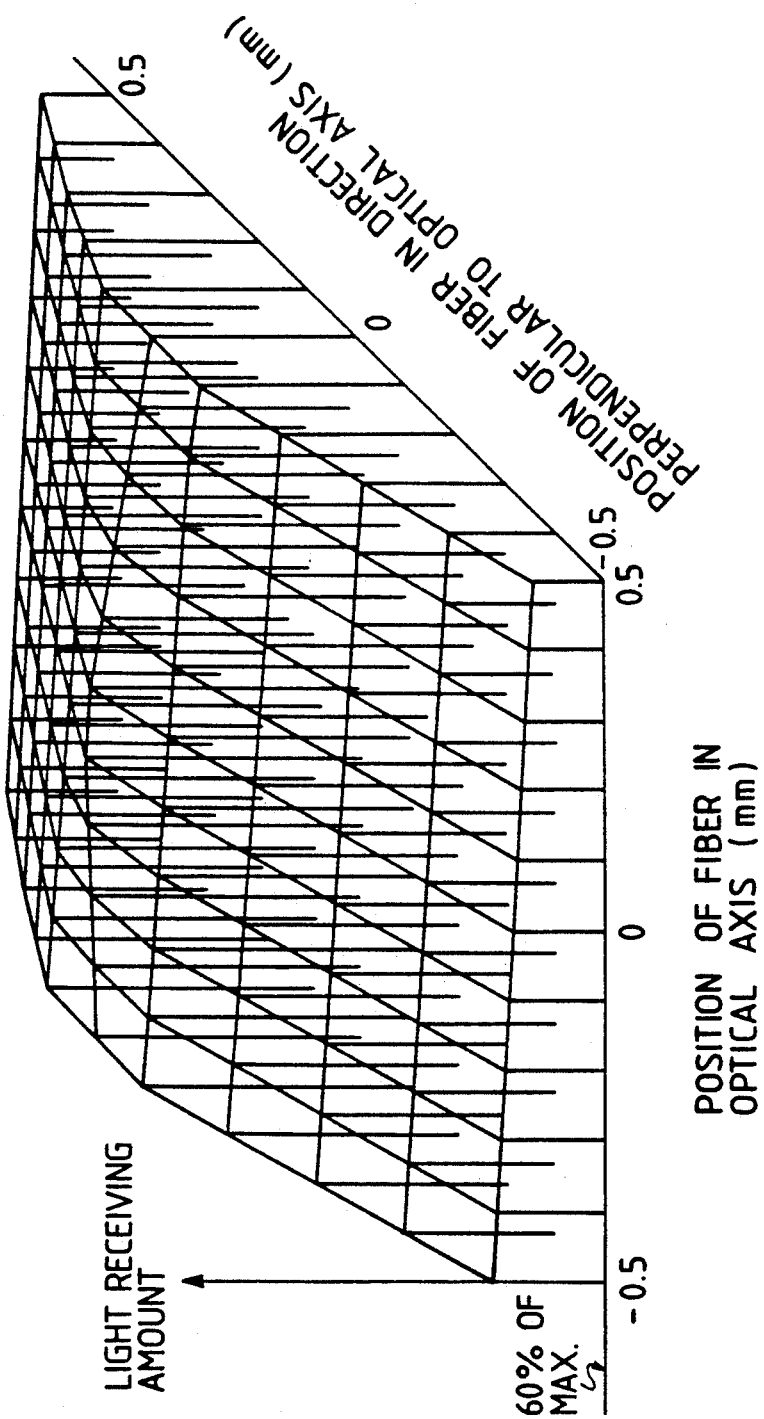
FIG. 11 is a graphical representation showing variation in an amount of light received by a photo-detector, which is caused due to displacement of the object to be measured.

FIG. 11 is a graphical representation showing variation in an amount of light received by a photo-detector, which is caused due to displacement of the object to be measured.

FIGS. 8–10, 12 and 13 are schematic diagrams each showing the modification of the embodiment shown in FIG. 6, in which additional means are provided to eliminate adverse effect due to the relatively large displacement of the fiber 64. In these figure, the elements which are same as or equivalent to those shown in FIG. 6 bear the same reference numerals, respectively.

Figure 8:
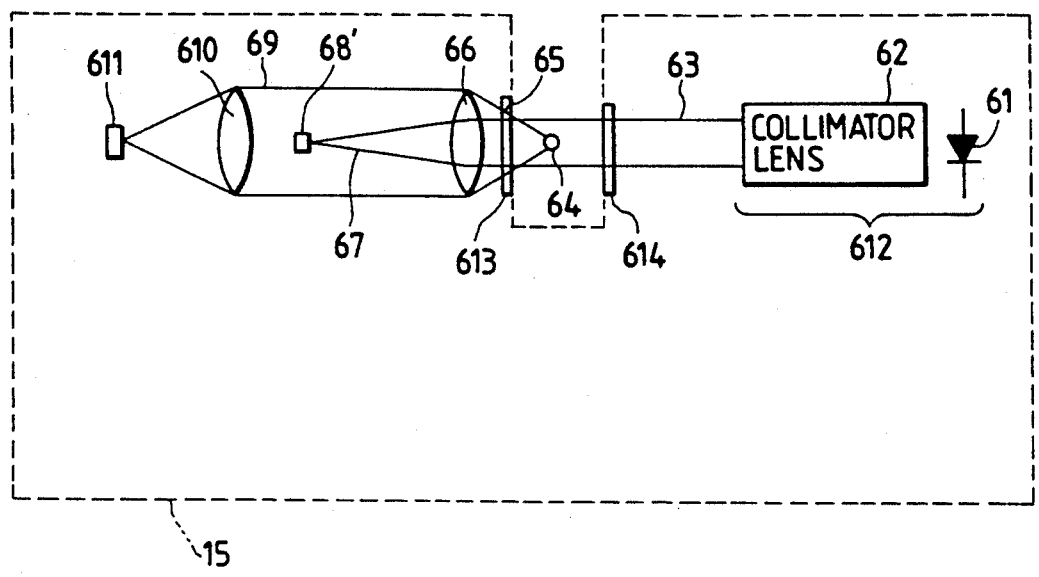
FIGS. 8-10, 12 and 13 are schematic diagrams each showing the modification of the embodiment shown in FIG. 6.

In FIG. 8, a photo-detector 68' for measuring the intensity of the light is provided instead of the shield plate 68 to compensate variations in the intensity of the light produced by said source and in the intensity of the light passing through said cylindrical member having the coating due to contamination of the surfaces of an incident light window 613 and a projecting light window 614.

Figure 9:
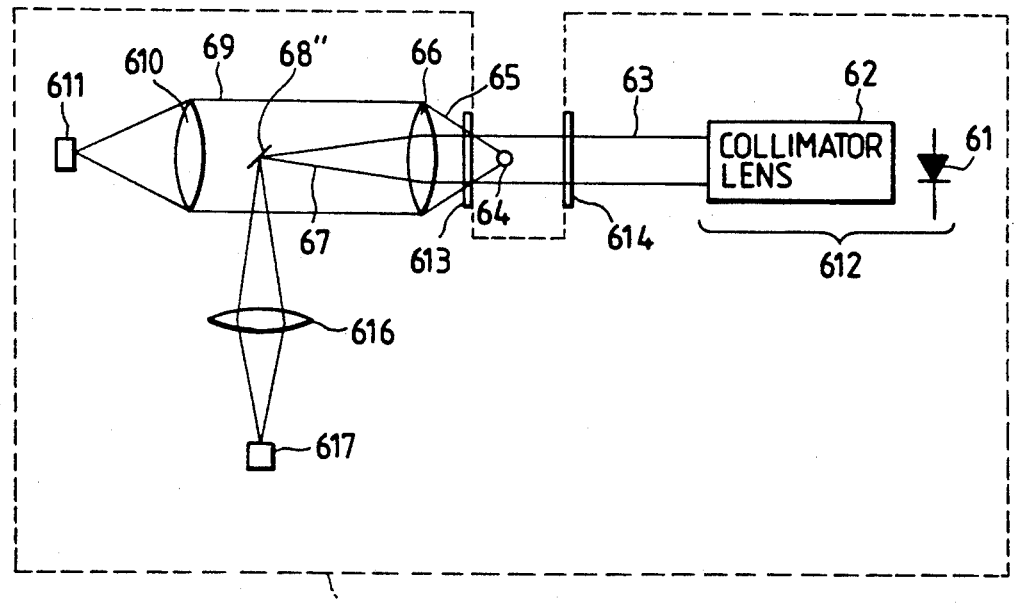

As shown in FIG. 9, a reflection mirror 68', may be replaced for the photo-detector 68', and a third image forming lens 616 and a photodetector 617 are provided to effect the same function as that of the photo-detector 68'. The reflecting mirror 68'' is provided to change an optical path of a part of the light to be directed to a light intensity detecting means for detecting the light intensity of the part of the light to compensate variations in the intensity of the light produced by the source 61 and in the intensity of the light passing through the cylindrical member 64 having the coating due to contamination of the surfaces of the incident and projecting light windows 613 and 614.

Figure 10:
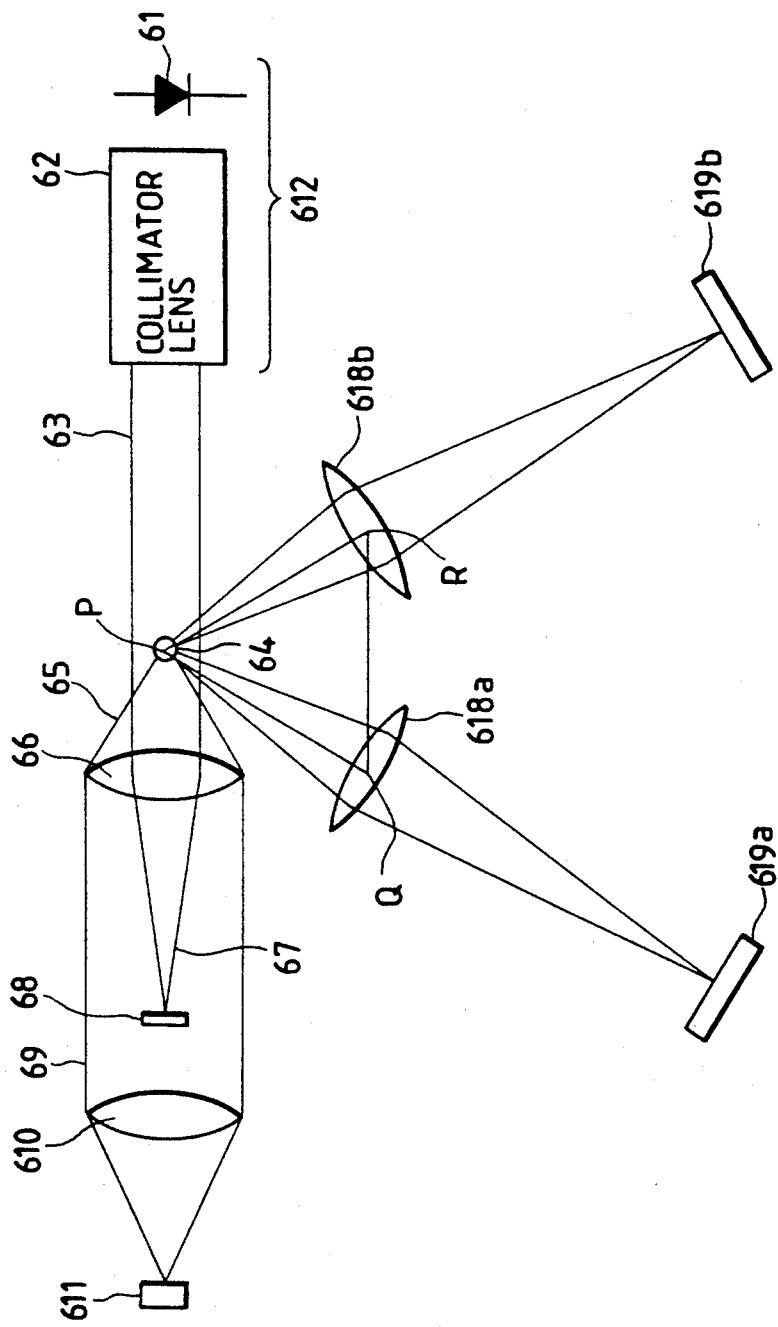
Figure 12:
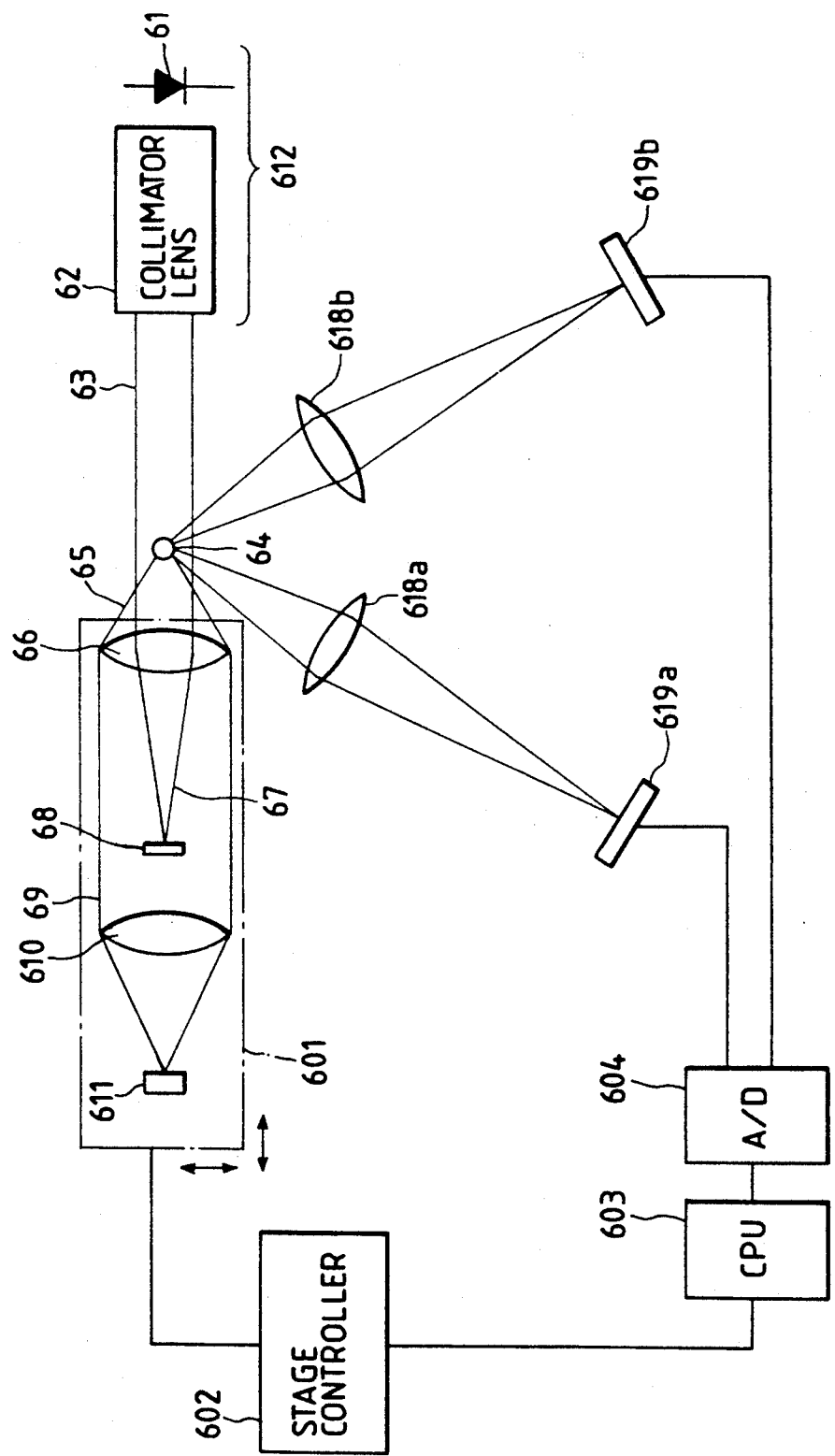
Figure 13:
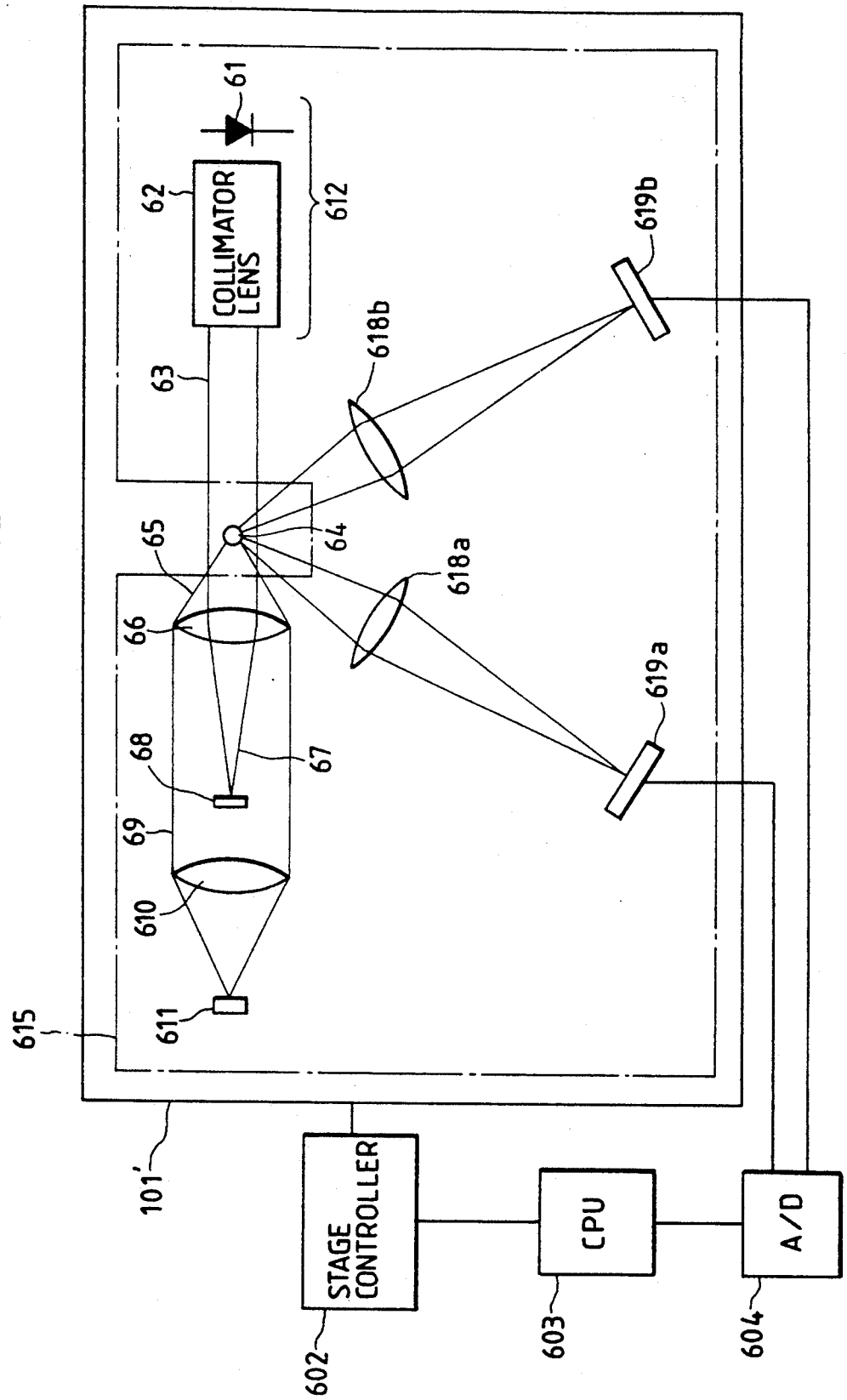

In FIG. 10, a pair of PSDs (Position Sensitive Device) are provided together with a pair of image forming lenses 618a and 618b to detect the center of optical power. With such a system as shown in FIG. 10, the position detection of the fiber is accomplished by way of triangulation with a predetermined distance OR between the lenses 618a and 618b and constant angles ∠PQR and ∠PRQ, and the position of the fiber relative to an optical system is detected to adjust an arrangement of said optical system. Further, the measured thickness may be corrected according to the relative position of the fiber. FIGS. 12 and 13 are schematic diagrams showing the above described modifications in which a two-axes moving stage 601 for the optical system, a stage controller 602, a CPU 603 and an A/D converter 604 are provided to process output signals from the PSD elements 619a and 619b, so that the the arrangement of the optical system is controlled according to the change in the relative position.

In accordance with the present invention, an object to be measured is illuminated with parallel rays of light and the intensity of refracted or reflected light of transmission is measured to determine the thickness of the coating on said object in a non-contact manner. Further, consistent measurements can be accomplished in spite of small displacements of the object. As another advantage, all of the unwanted light that is neither refracted nor transmitted through the object is absorbed by the shield member and will not reach the photo-detector to cause adverse effects on the results of measurement.

Consequently, on-line measurements of the thickness of coating can be performed as the object to be measured is produced. The results of a specific measurement are immediately fed back to the coating device and by continuing the production with a relevant parameter such as the feed of coating materials being properly adjusted, a coating having the appropriate thickness can be obtained.

What is claimed is:

1. A method of measuring the thickness of a coating on the outer surface of a cylindrical member comprising the steps of:

irradiating the outer surface of said coated cylindrical member with parallel light which has a beam width wider than the diameter of said coated cylindrical member, said parallel light having neither 0% nor 100% transmittance through said cylindrical member;

separating the light passing through said cylindrical member from the light passing by said cylindrical member by condensing each said light onto different positions;

receiving the light passing through said cylindrical member by a photodetector;

determining the thickness of the coating around the cylindrical member on the basis of the quantity of light received by said photodetector;

determining the position of said cylindrical member relative to an optical system; and correcting the thickness of said coating based on the thus determined position of said cylindrical member.

2. A method of measuring the thickness of a coating provided about the periphery of a cylindrical member comprising the steps of:

arranging a source of parallel light, a first focusing lens, a shield member, a second focusing lens and a photo-detector respectively on a single axis with the distance between said source of said parallel rays of light and said first focusing lens being longer than the focal length of said first focusing lens, the distance between said first focusing lens and said shield member being equal to the focal distance of said first focusing lens, the distance between said second focusing lens and said photo-detector being equal to the focal length of said second focusing lens, positioning said cylindrical member at the focal point of said first focusing lens on the side closer to said source of parallel light in a direction perpendicular thereto, irradiating said cylindrical member with the parallel light having a beam width wider than the diameter of said cylindrical member, the parallel light having neither 0% nor 100% transmittance through said cylindrical member having the coating to be measured, collimating the irradiated light which passes through said cylindrical member by said first focusing lens, passing the collimated light into said second focusing lens, condensing the light passing through said second focusing lens at the photo-detector, absorbing condensed light which does not pass through said cylindrical member with said shield member, and determining the thickness of the coating around the cylindrical member on the basis of the quantity of light received by said photo-detector.

3. A method of measuring the thickness of a coating provided about the periphery of a cylindrical member with an optical system, the method comprising the steps of:

arranging a source of parallel light, a first focusing lens, a light receiving means for measuring the intensity of the light, a second focusing lens and a photo-detector respectively on a single axis with the distance between said first focusing lens and said light receiving means being equal to the focal distance of said first focusing lens, the distance between said second focusing lens and said photo-detector being equal to the focal length of said second focusing lens, positioning said cylindrical member at the focal point of said first focusing lens on the side closer to said source of parallel rays of light in a direction perpendicular thereto, irradiating said cylindrical member with the parallel light having a beam width wider than the diameter of said cylindrical member, the parallel light having neither 0% nor 100% transmittance through said cylindrical member having the coating to be measured, compensating variations in the intensity of the light produced by said source and variations in the intensity of the light passing through said cylindrical member having the coating due to contamination of the surfaces of windows of the optical system by use of said light receiving means, collimating the irradiated light which passes through said cylindrical member by the first focusing lens, passing the collimated light into said second focusing lens, condensing the light passing through said second focusing lens at the photo-detector, and determining the thickness of the coating around the cylindrical member on the basis of the quantity of light received by said photo-detector.

4. A method of measuring the thickness of a coating provided about the periphery of a cylindrical member with an optical system, the method comprising the steps of:

arranging a source of parallel rays of light; a first focusing lens; a reflecting element, a second focusing lens and a photo-detector respectively on a single axis with the distance between said source of parallel rays of light and said first focusing lens being longer than the focal length of said first focusing lens, the distance between said first focusing lens and said reflecting element being equal to the focal distance of said first focusing lens, the distance between said second focusing lens and said photo-detector being equal to the focal length of said second focusing lens, positioning said cylindrical member at the focal point of said first focusing lens on the side closer to said source of parallel rays of light in a direction perpendicular thereto, irradiating said cylindrical member with the parallel light having neither 0% nor 100% transmittance through said cylindrical member having the coating to be measured, changing an optical path of a part of the light to be directed to a light intensity detecting means for detecting the light intensity of the part of the light to compensate variations in the intensity of the light produced by said source and variations in the intensity of the light passing through said cylindrical member having the coating due to contamination of the surfaces of windows of the optical system, by use of said reflecting element and said light intensity detecting means, collimating the irradiated light which passes through said cylindrical member by the first focusing lens, passing the collimated light into said second focusing lens, condensing the light passing through said second focusing lens at the photo-detector, and determining the thickness of the coating around the cylindrical member on the basis of the quantity of light received by said photo-detector.

5. The measuring method as defined in claim 2, 3 or 4, wherein the position of said cylindrical member relative to an optical system is detected to correct the thickness of said coating based on the thus detected position of said cylindrical member.

6. The measuring method as defined in claim 1, 2, 3 or 4, wherein the position of said cylindrical member relative to an optical system is detected to adjust an arrangement of said optical system.

7. An apparatus for measuring the thickness of a coating on the outer surface of a cylindrical member comprising:

an irradiating means for irradiating the outer surface of said coated cylindrical member with parallel light which has a beam wider than the diameter of said cylindrical member, said parallel light having neither 0% nor 100% transmittance through said coated cylindrical member;

means for separating the light passing through said cylindrical member from the light passing by said cylindrical member by condensing each said light onto different positions; and means for receiving the light passing through said cylindrical member;

the thickness of the coating around the cylindrical member being determined on the basis of the quantity of light passing through said cylindrical member, the position of said cylindrical member relative to an optical system being determined to correct the thickness of said coating based on the thus determined position of said cylindrical member.

8. An apparatus for measuring the thickness of a coating provided about the periphery of a cylindrical member comprising:

a source of parallel light rays for irradiating said cylindrical member, said light rays having a beam width wider than the diameter of the cylindrical member, said light rays having neither 0% nor 100% transmittance through said cylindrical member having the coating to be measured; and an optical system for selecting irradiating light which passes through said cylindrical member, said optical system including:

a first focusing lens; a shield member; a second focusing lens and a photo-detector arranged respectively on a single axis, the distance between said source of parallel rays of light and said first focusing lens being longer than the focal length of said first focusing lens, the distance between said first focusing lens and said shield member being equal to the focal distance of said first focusing lens, the distance between said second focusing lens and said photo-detector being equal to the focal length of said second focusing lens, said shield member having a sufficient size to shield a spot of parallel rays which passes by said cylindrical member and is condensed by said first focusing lens, said cylindrical member being positioned at the focal point of said first focusing lens on the side closer to said source of parallel rays of light in a direction perpendicular thereto, and the thickness of the coating film around said cylindrical member being determined on the basis of the quantity of light received by said photo-detector.

9. An apparatus for measuring the thickness of a coating provided about the periphery of a cylindrical member comprising:

a source of parallel light rays for irradiating said cylindrical member, said light rays having a beam width wider than the diameter of the cylindrical member, said light rays having neither 0% nor 100% transmittance through said cylindrical member having the coating to be measured; and an optical system for selecting irradiating light which passes through said cylindrical member, said optical system including:

a first focusing lens; a light receiving means for measuring the intensity of the light to compensate variations in the intensity of the light produced by said source and in the intensity of the light passing through said cylindrical member having the coating due to contamination of the surfaces of windows of the optical system; a second focusing lens and a photo-detector arranged respectively on a single axis, the distance between said source of parallel rays of light and said first focusing lens being longer than the focal length of said first focusing lens, the distance between said first focusing lens and said light receiving means being equal to the focal distance of said first focusing lens, the distance between said second focusing lens and said photo-detector being equal to the focal length of said second focusing lens, said cylindrical member being positioned at the focal point of said first focusing lens on the side closer to said source of parallel rays of light in a direction perpendicular thereto, and the thickness of the coating film around said cylindrical member being determined on the basis of the quantity of light received by said photo-detector.

10. An apparatus for measuring the thickness of a coating provided about the periphery of a cylindrical member, comprising:

a source of parallel light rays for irradiating said cylindrical member, said light rays having a beam width wider than the diameter of said cylindrical member, said light rays having neither 0% nor 100% transmittance through said cylindrical member having the coating to be measured; and an optical system for selecting irradiating light which passes through said cylindrical member, said optical system including:

a first focusing lens; a reflecting means for changing an optical path of a part of the light to be directed to a light intensity detecting means for detecting the light intensity of the part of the light to compensate variations in the intensity of the light produced by said source and in the intensity of the light passing through said cylindrical member having the coating due to contamination of the surfaces of windows of the optical system; a second focusing lens and a photo-detector arranged respectively on a single axis, the distance between said source of parallel rays of light and said first focusing lens being longer than the focal length of said first focusing lens, the distance between said first focusing lens and said reflecting means being equal to the focal distance of said first focusing lens, the distance between said second focusing lens and said photo-detector being equal to the focal length of said second focusing lens, said cylindrical member being positioned at the focal point of said first focusing lens on the side closer to said source of parallel rays of light in a direction perpendicular thereto, and the thickness of the coating film around said cylindrical member being determined on the basis of the quantity of light received by said photo-detector.

11. The measuring apparatus as defined in claim 8, 9 or 10, wherein the position of said cylindrical member relative to an optical system is detected to correct the thickness of said coating based on the thus detected relative position of said cylindrical member.

12. The measuring apparatus as defined in claim 7, 8, 9 or 10, wherein the position of said cylindrical member relative to an optical system is detected to adjust an arrangement of said optical system.

13. An optical fiber manufacturing system for manufacturing optical fiber being coated about the periphery thereof, said system comprising:
   manufacturing means for producing a bare optical fiber;
   means for coating the periphery of said bare optical fiber;
   an optical system for measuring the thickness of a coating provided about the periphery of a cylindrical member including:
   an irradiating means for irradiating said coated cylindrical with parallel light which has a beam width wider than the diameter of said cylindrical member, said parallel light having neither 0% nor 100% transmittance through said coated cylindrical member;
   a separating means for separating the light passing through said cylindrical member from the light passing by said cylindrical member by condensing each said light onto different positions; and
   means for receiving the light passing through said cylindrical member;
   the thickness of the coating around the cylindrical member being determined on the basis of the quantity of light passing through said cylindrical member, an amount of coating material to be supplied to said coating means being controlled according to variation in the thickness of said coating that is detected by said optical system, the position of said cylindrical member relative to an optical system being determined to correct the thickness of said coating based on the thus determined position of said cylindrical member.

14. An optical fiber manufacturing system for manufacturing optical fiber being coated about the periphery thereof, said system comprising:
   manufacturing means for producing a bare optical fiber;
   means for coating the periphery of said bare optical fiber; and
   an optical system for selecting light passing through said optical fiber including:
   a source of parallel rays of light; a first focusing lens; a shield member; a second focusing lens and a photo-detector arranged in this order on a single axis, said parallel rays of light having a beam width wider than the diameter of said cylindrical member, said parallel rays of light having neither 0% nor 100% transmittance through said cylindrical member having the coating to be measured, the distance between said source of parallel rays of light and said first focusing lens being longer than the focal length of said first focusing lens, the distance between said first focusing lens and said shield member being equal to the focal distance of said first focusing lens, the distance between said second focusing lens and said photo-detector being equal to the focal length of said second focusing lens, said shield member having a sufficient size to shield a spot of parallel rays which passes by said cylindrical member and is condensed by said first focusing lens, said cylindrical member being positioned at the focal point of said first focusing lens on the side closer to said source of parallel rays of light in a direction perpendicular thereto, and the thickness of the coating film around said cylindrical member being determined on the basis of the quantity of light received by said photo-detector, an amount of coating material to be supplied to said coating means being controlled according to variation in the thickness of said coating that is detected by said photo-detector.

15. An optical fiber manufacturing system for manufacturing optical fiber coated about the periphery thereof, said system comprising:
   manufacturing means for producing a bare optical fiber;
   means for coating the periphery of said base optical fiber; and
   an optical system for selecting light passing through said optical fiber including;
   a source of parallel rays of light, a first focusing lens; a reflecting means for changing an optical path of a part of the light to be directed to a light intensity detecting means for detecting the light intensity of the part of the light to compensate variations in the intensity of the light produced by said source and in the intensity of the light passing through said cylindrical member having the coating due to contamination of the surfaces of windows of the optical system; a second focusing lens and a photo-detector arranged in this order on a single axis, said parallel rays of light having a beam width wider than the diameter of said cylindrical member, said parallel rays of light having neither 0% nor 100% transmittance through said cylindrical member having the coating to be measured, the distance between said source of parallel rays of light and said first focusing lens, the distance between said first focusing lens and said reflecting means being equal to the focal distance of said first focusing lens, the distance between said second focusing lens and said photo-detector being equal to the focal length of said second focusing lens, said cylindrical member being positioned at the focal point of said first focusing lens on the side closer to said source of parallel rays of light in a direction perpendicular thereto, and the thickness of the coating film around said cylindrical member being determined on the basis of the quantity of light received by said photo-detector,
   an amount of coating material to be supplied to said coating means being controlled according to variation in the thickness of said coating that is detected by said photo-detector.

16. An optical fiber manufacturing system for manufacturing optical fiber coated about the periphery thereof, said system comprising:
   manufacturing means for producing a bare optical fiber;
   means for coating the periphery of said bare optical fiber; and
   an optical system for selecting light passing through said optical fiber including:
   a source of parallel rays of light, a first focusing lens; a light receiving means for measuring the intensity of the light to compensate variations in the intensity of the light produced by said source and in the intensity of the light passing through said cylindrical member having the coating due to contamination of the surfaces of windows of the optical system; a second focusing lens and a photo-detector arranged in this order on a single axis, said parallel rays of light having a base width wider than the diameter of said cylindrical member, said parallel rays of light having neither 0% nor 100% transmittance through said cylindrical member having the coating to be measured, the distance between said source of parallel rays of light and said first focusing lens being longer than the focal length of said first focusing lens, the distance between said first focusing lens and said light receiving means being equal to the focal distance of said first focusing lens, the distance between said second focusing lens and said photo-detector being equal to the focal length of said second focusing lens, said cylindrical member being positioned at the focal point of said first focusing lens on the side closer to said source of parallel rays of light in a direction perpendicular thereto, and the thickness of the coating film around said cylindrical member being determined on the basis of the quantity of light received by said photo-detector, an amount of coating material to be supplied to said coating means being controlled according to variation in the thickness of said coating that is detected by said photo-detector.

17. The system as defined in claim 14, 15 or 16, wherein the position of said cylindrical member relative to an optical system is detected to correct the thickness of said coating based on the thus detected relative position of said cylindrical member.

18. The system as defined in claim 13, 14, 15, or 16, wherein the position of said cylindrical member relative to an optical system is detected to adjust an arrangement of said optical system.

* * * * *